May 1, 1951 G. R. ANDERSON ET AL 2,551,521

COIL WINDING APPARATUS FOR MAGNETIC CORES

Filed Feb. 15, 1947 5 Sheets-Sheet 1

INVENTORS
GORDON R. ANDERSON
JAMES K. GIBBS
By Paul L. Kesler
ATTORNEY

COIL WINDING APPARATUS FOR MAGNETIC CORES

Filed Feb. 15, 1947 5 Sheets-Sheet 2

INVENTORS
GORDON R. ANDERSON
JAMES K. GIBBS
BY Paul L. Knobel
ATTORNEY

COIL WINDING APPARATUS FOR MAGNETIC CORES

Filed Feb. 15, 1947 5 Sheets-Sheet 3

INVENTORS
GORDON R. ANDERSON
JAMES K. GIBBS
BY Paul L. Keohu
ATTORNEY

COIL WINDING APPARATUS FOR MAGNETIC CORES

Filed Feb. 15, 1947 5 Sheets-Sheet 4

INVENTORS
GORDON R. ANDERSON
JAMES K. GIBBS
BY Paul L. Kohler
ATTORNEY

COIL WINDING APPARATUS FOR MAGNETIC CORES

Filed Feb. 15, 1947 5 Sheets-Sheet 5

INVENTORS
GORDON R. ANDERSON
JAMES K. GIBBS
BY Paul L. Kesler
ATTORNEY

Patented May 1, 1951 2,551,521

UNITED STATES PATENT OFFICE 2,551,521

COIL WINDING APPARATUS FOR MAGNETIC CORES

Gordon R. Anderson and James K. Gibbs, Beloit, Wis., assignors to Fairbanks, Morse & Co., Chicago, Ill., a corporation of Illinois Application February 15, 1947, Serial No. 728,772

12 Claims. (Cl. 242—1)

This invention relates in general to coil winding apparatus, and has reference more particularly to novel mechanism for forming and winding coils upon magnetic cores for electrical machines and the like, the mechanism according to the invention being especially suitable to the coil winding of magnetic cores of the character employed in electrical machines of axial air gap type.

Coil winding apparatus for forming and applying coils to magnetic cores of the character utilized in the conventional cylindrical air gap type of electric motors, generators, and the like, are known and in some forms thereof, have proved commercially successful particularly in the winding of armatures. However, such apparatus is wholly unsuited to, and incapable of any ready adaptation for, coil winding of axial air gap machine cores wherein the polar faces are planar, and the coil-receiving slots usually are radially directed or substantially so. Some attempts have been made to construct coil winding apparatus for axial air gap machine cores, but such to applicant's knowledge have not resulted in any commercially successful apparatus for this purpose. It is, therefore, the principal object of the present invention to afford a novel and effective coil forming and winding apparatus which is applicable in particular, to the coil winding of magnetic cores provided for axial air gap motors, generators and the like.

Another important object of the invention is to provide apparatus for the purpose indicated, which includes coil-forming and winding mechanism for operative association with a slotted magnetic core, adapted to form successive coil loops and substantially simultaneously therewith, to effect slot-insertion of the loops as they are formed, the mechanism accomplishing the foregoing in a direct and positive manner such as to afford coils of substantially uniform winding section.

Another object is to provide apparatus of the character and for the purpose indicated, which is adjustable in respect to the rate of coil loop formation, and further, which is readily adaptable to the forming and applying of coils to the magnetic core such that each coil winding spans a selected number of core slots.

Further objects and advantages of the present invention will appear from the following description of a presently preferred embodiment thereof, as such is illustrated by the accompanying drawings, wherein.

Figure 1:
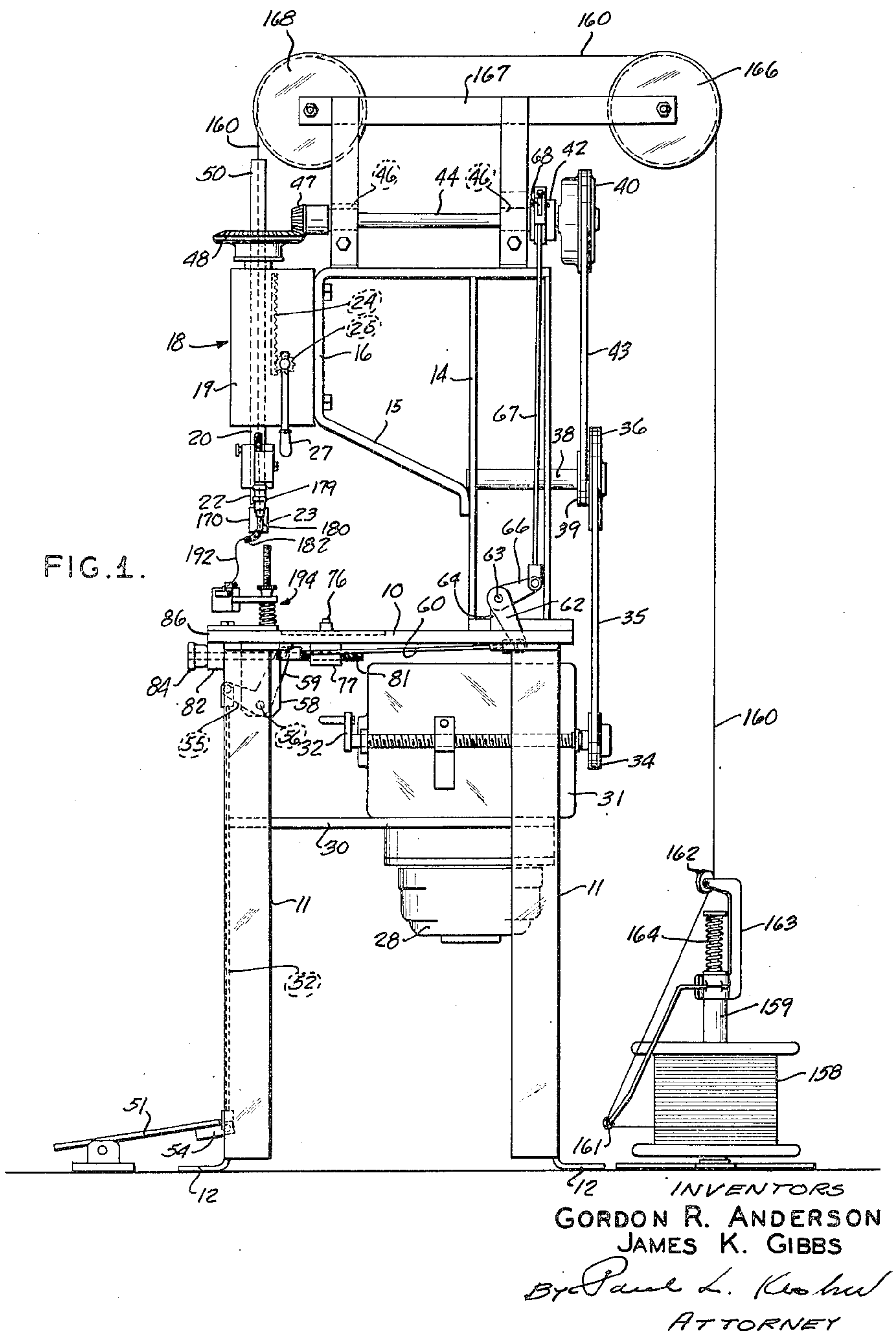
Fig. 1 is a side elevational view of a coil forming and winding apparatus embodying the present invention.

Referring to the apparatus in assembly as such appears in Figs. 1 to 6, there is provided a supporting frame structure including a horizontal platform or table 10 on vertical legs 11 one at each of the four corners of the platform, the legs terminating in feet 12 for securement to the floor or other base. Vertically upstanding on the table 10 preferably in the region of the left-hand rear corner thereof (Figs. 1 and 2), is a standard 14 which supports a bracket 15 extending forwardly over the table. Suitably secured to the bracket at its forward end 16, is a rotary spindle head structure 18 similar to a drill press head, comprising a housing 19 providing an operative support for a vertically extending spindle 20 therein, the spindle being of hollow or tubular form and carrying at its lower free end 22 below the housing 19, a cylindrical bearing element or stud 23 for a purpose to appear. The spindle 20 is rotatably journalled in housing 19 in any suitable manner not here shown, such as to permit axial displacement movements thereof, which may be effected by the well-known expedient frequently employed in drill-press head structures, of a rack 24 and pinion 26 shown in broken outline in Fig. 1, the pinion being rotatable through an operating lever 27 accessible externally of the housing 19. The operative connection between the rack 24 and spindle 20 (not shown) is of a character to allow pinion drive of the rack to raise or lower the spindle, without interference with spindle rotation.

In the present embodiment of the invention, spindle rotation is effected from an electric motor 28 suitably suspended from a sub-platform 30 of the table structure, and preferably direct-connected or close-coupled to a speed-reduction gear unit 31 of any desired type, mounted over the motor on sub-platform 30. The gear-reduction unit 31 is of an adjustable character, regulatable through hand crank 32 such as to determine a desired speed of the power output pulley 34 of the unit. A belt 35 preferably of the V type, connects pulley 34 and the larger pulley 36 of a two-step pulley freely journalled on a stub shaft 38 secured to an intermediate portion of the standard 14, the smaller step-pulley 39 in turn being connected with pulley 40 of a clutch device 42, by a similar V-belt 43. Clutch pulley 40 is free on a cross-shaft 44 extending horizontally and forwardly over the bracket 15, the shaft being rotatably supported by bearings 46 on the bracket and having secured to its forward end a pinion 47. Pinion 47 drivingly engages a gear 48 suitably rotatably supported on housing 19, the gear being located for extension of the upper end 50 of the spindle 20 axially therethrough, and being splined or otherwise connected to the spindle to effect rotation of the latter while permitting axial displacement movements of the spindle relative to the gear.

Figures 2, 8, 9:
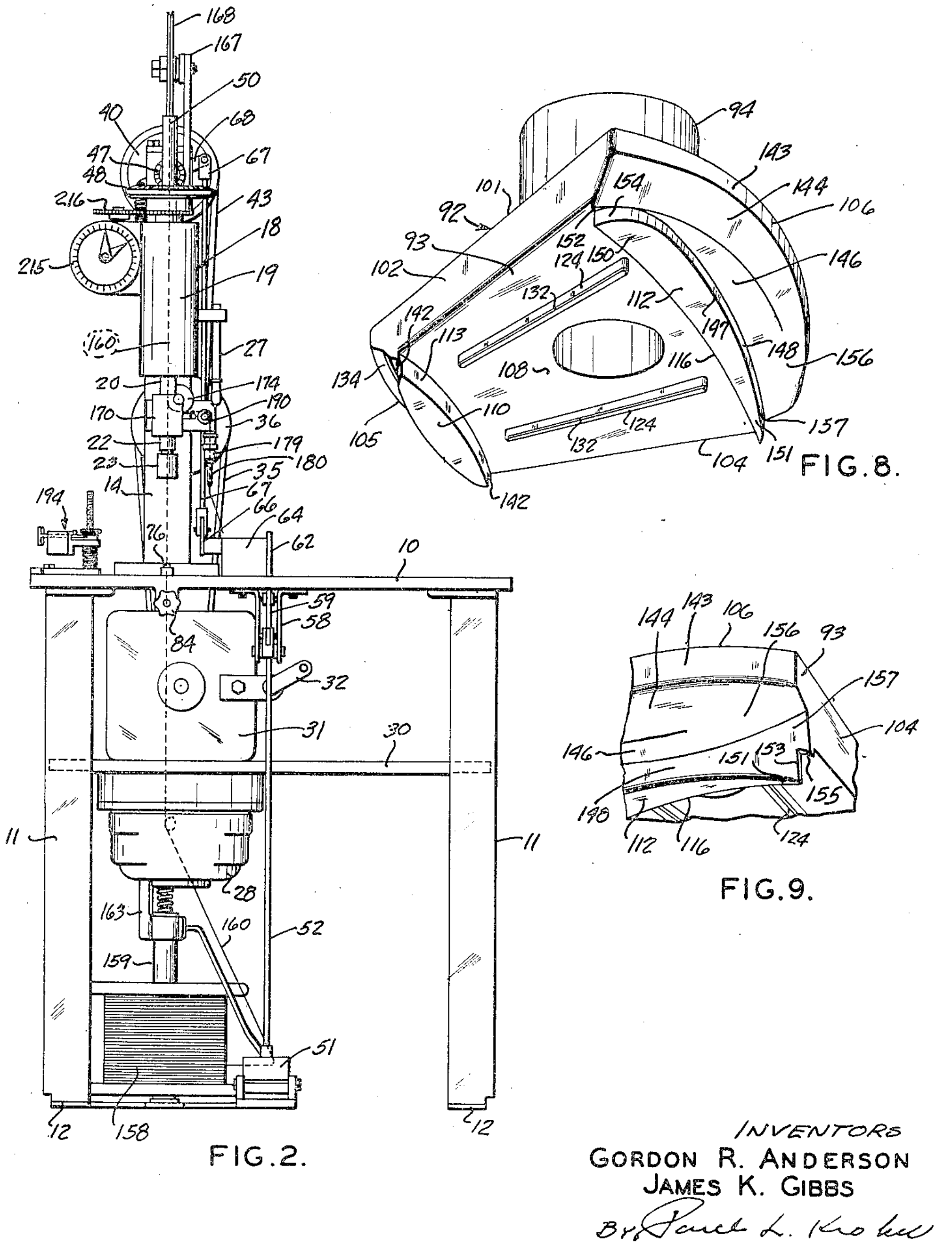
Fig. 2 is a front elevational view of the apparatus.
Fig. 8 is an enlarged view in perspective elevation, of the coil forming and applying shoe.
Fig. 9 is a fragmentary view in perspective, of the element or shoe, illustrating a detail thereof.

The clutch device 42 may be of any desired character suitable for positive connection and disconnection of the shaft 44 and pulley 40, and is here controlled at the will of the operator of the apparatus, through a foot-treadle 51 (Figs. 1 and 2). The operating linkage between the treadle and clutch may be as shown, comprised of a rod 52 extending vertically from the free end 54 of the treadle to one arm 55 of a bell crank pivoted at 56 to a bracket 58 depending from the forward edge of table 10. The other arm 59 of the bell crank is connected by a rod 60 to a crank arm 62 on a shaft 63, the shaft being suitably rotatably carried by a bearing 64 on table 10. A second arm 66 on shaft 63 is connected by a rod 67, to the clutch operating lever 68. The clutch and operating linkage arrangement is such that in the raised position of the treadle (Fig. 1) the clutch will be disengaged, thereby freeing the shaft 44 from the clutch pulley 40, while upon operator-depression of the treadle, the clutch will be thereby engaged to connect the shaft and pulley 40 for spindle rotation.

Figures 3, 4:
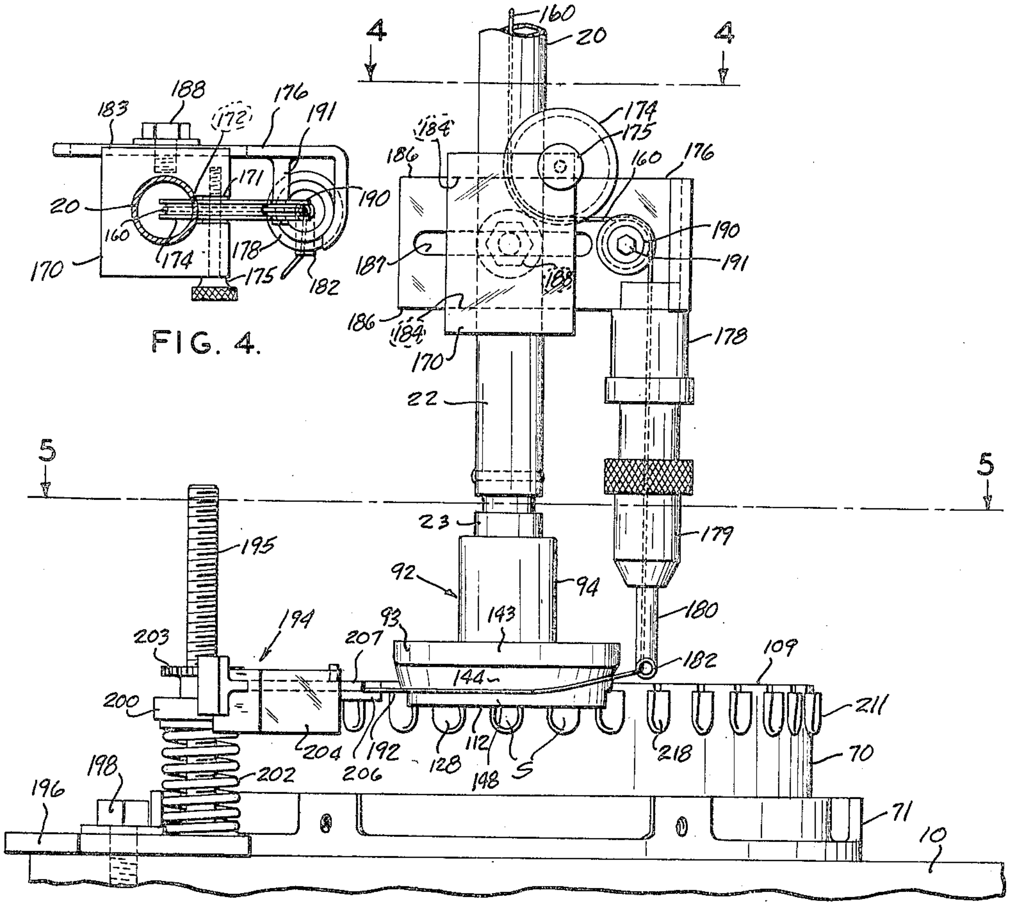
Fig. 3 is an enlarged, fragmentary elevational view of the apparatus, illustrating the coil forming and winding mechanism thereof and a core to be wound.
Fig. 4 is a detail plan view of a part of the mechanism, as viewed from line 4—4 in Fig. 3.
Figure 7:
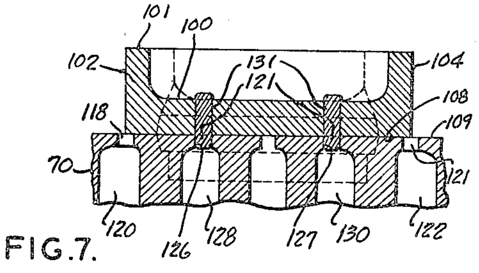
Fig. 7 is an enlarged, fragmentary section through a coil forming and applying element or shoe, and the underlying core to be wound, as taken along line 7—7 in Fig. 5.
Figures 5, 10, 11:
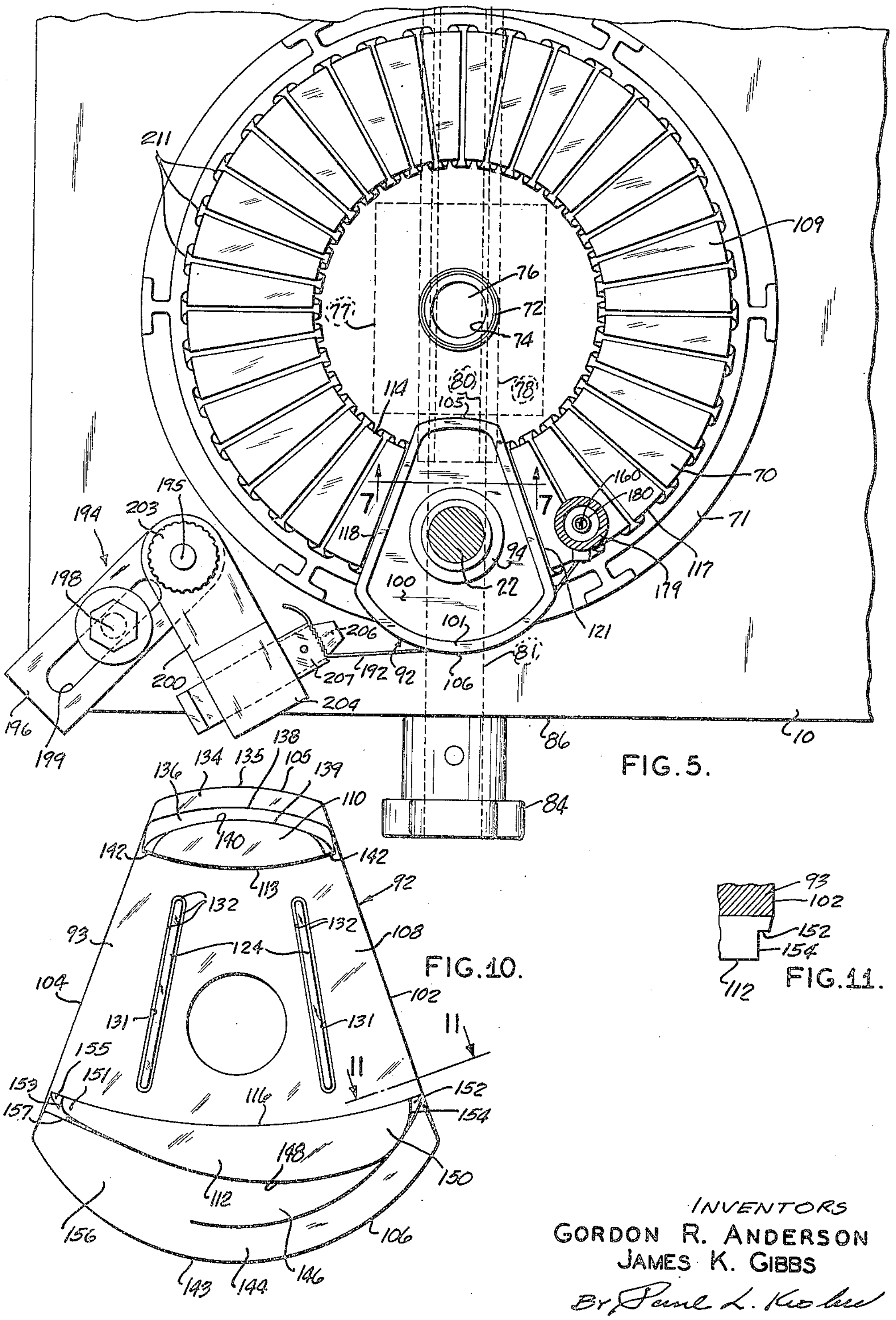
Fig. 5 is a plan view of the mechanism in relation to a core to be wound, as viewed from line 5—5 in Fig. 3.
Fig. 10 is a plan view of the element or shoe, looking toward the under side thereof.
Fig. 11 is a fragmentary sectional view of the shoe, as taken from line 11—11 in Fig. 10.
Figure 6:
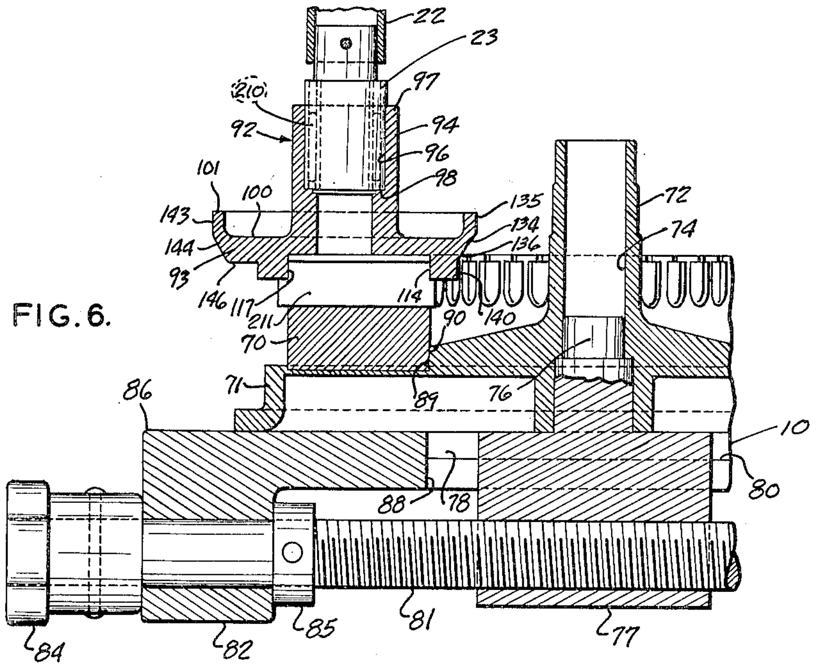
Fig. 6 is a fragmentary sectional elevation of the apparatus, showing the adjustable mounting of a core to be wound.

With reference now in particular to Figs. 3, 5 and 6, the slotted magnetic core to be wound, is arranged on the table 10 below the spindle head structure. In the present example, the core shown at 70, is seated and axially centered upon a disc-like support 71 having a central hub 72 which is bored axially as at 74. The support 71 which may rest upon the table 10, is located to receive in the bore 74 thereof, an upstanding cylindrical stud 76 formed as a part of a slide member or block 77. Block 77 projects downwardly through an elongate slot 78 provided in table 10, and is slidable therealong upon flangeways 80 along the longitudinal slot margins. The position of the block along the slot may be determined as desired, by an adjustment device comprising a threaded rod 81 rotatably carried by a depending portion 82 of the table 10 at its forward edge, and threadedly engaging the block 77 below the table. An operating handle 84 fixed to the rod at its forward end, facilitates turning of the rod to effect threaded displacement of block 77 along the table slot 78, whereby adjustments in the position of the magnetic core 70 may be effected for the coil winding operation as will appear hereinafter. Axial movement of the rod 81 is prevented by a collar 85 thereon in abutment with table portion 82.

As will appear from the drawing, particularly Figs. 5 and 6, the table slot 78 has its major or longitudinal extent directed substantially normal to the front margin or edge 86 of table 10, and further is located such that the longitudinal slot axis in extension intersects the vertical axis of the rotary spindle 20. Moreover, the axis of the block stud 76, coincident with the axis of the spindle 20, intersects the longitudinal slot axis. From this it will appear that in block movement to shift the core 70 toward or from the forward table edge 86 as a reference, the axis of the annular core 70 which is coincident with the axis of the support 71, will move along a straight line which intersects the core axis and the axis of spindle 20. Displacement of the core forwardly of the table 10 is, however, limited as by abutment of the block 77 with the end 88 of slot 78, such that the core axis cannot be brought into coincidence with the spindle axis. The purpose served by the foregoing relative arrangement of parts, will appear from the description hereinafter of the operation of the apparatus.

It is to be noted here that while the support 71 for the core to be wound, may be provided as a part of the winding apparatus, in practice the support may well be the core-supporting frame of the electrical machine, as a motor or generator, in which the core when wound, is to be embodied. In either case, the support 71 embodies a core-centering expedient, as the circular shoulder 89 against which abuts the inner circumferential margin 90 of the core 70, whereby the axis of the annular core is located in coincidence with the axis of the hub 72 of the support. Furthermore and for a purpose to appear, the core support 71 which is mounted on block 77 through reception of the block stud 76 in the hub bore 74 of the support, is relatively freely rotatable on the block, about the stud as the axis.

Turning now to the coil forming and winding member or shoe, and its application to the core 70 (Figs. 5 to 11), the shoe indicated generally by the numeral 92, comprises a body 93 providing a centrally outstanding cylindrical hub 94 which is step-bored therethrough to provide the larger bore 96 open to the hub end 97 and terminating within the hub in a shoulder 98 (Fig. 6). The body face 100 from which the hub 94 extends, is rimmed by a continuous, upstanding flange 101. The body with the flange 101, is formed according to the configuration shown, to present opposite flat or planar side faces 102 and 104 which are angularly related as appears, merging at the narrow end of the body with the arcuate end face 105 and diverging therefrom to mergence with the opposite arcuate end face 106. The opposite or under face 108 of the shoe is planar in conformity with the planar pole face 109 of the core 70 with which it contacts in operative positionment of the shoe on the core. For locating the shoe on the core face 109 radially of the core, the body structure includes opposite flange-like projections 110 and 112, the projection 110 presenting a face 113 of a curvature corresponding to the curvature of the inner face 114 of the core 70, and the other projection 112 presenting a face 116 of a curvature corresponding to the curvature of the outer core face 117, these faces of the flange projections being disposed adjacent the indicated core faces in placement of the shoe on the core, as may be appreciated from the sectional view of Fig. 6.

In the present example, the shoe is adapted in its dimensioning, for spanning five slots of the core and such that when the shoe is properly located on the core, the planar shoe face 102 will be in a plane through the radial center line of the opening 118 to the first core slot 120 (Figs. 5 and 7), while the shoe face 104 similarly will be in a plane through the radial center line of the opening 121 to the fifth core slot 122. Thus the angle of convergence of the shoe faces 102 and 104 is equal to the angle between the radial axes of the first and fifth slots of the five slots spanned by the shoe. The foregoing location of the shoe relative to the core slots spanned, is here afforded in a positive manner by flange-like elements 124 outstanding on the core-engaging face 108 of the shoe (Figs. 7 and 10), these being positioned and relatively angularly directed for seating in the slot openings 126 and 127 of the second and fourth slots 128 and 130 respectively, in shoe mounting on the core. The flange elements 124 may be integral with the shoe body, but as presently preferred, each is provided as a separate strip member inserted through a slot 131 in the body 93 (Fig. 7) and suitably secured therein. Further, in order to facilitate ready insertion of these shoe locating elements in the core slot openings, each has its marginal edges 132 rounded or bevelled as shown.

The shoe 92 provides as before indicated, the wire guide and coil-forming part of the apparatus, being effective as a line of wire is led by means presently to be described, about and in substantial engagement with the shoe side and end faces, to determine successive coil loops each of a form corresponding to the perimetral contour of the shoe. Importantly to the present invention, the shoe contour particularly of the end faces 105 and 106, is such as to adapt the shoe for the further function of causing coil loop insertion in the core slots in registry with the shoe sides 102 and 104, this taking place substantially coincidentally with coil loop formation as will appear hereafter.

With reference now to Figs. 8 to 11 in particular, the shorter arcuate end face 105 of the shoe 92 is undercut as appears in Figs. 8 and 10 and from the sectional view of Fig. 6, in a manner to provide a bevelled surface portion 134 continuing inwardly of the shoe from the part-cylindrical surface 135 which is uppermost in the position of the shoe on the core to be wound, and a surface portion 136 bevelled inwardly to a lesser degree than the bevelled surface portion 134, adjoining the latter with the line of juncture indicated by a perceptible score line 138 (Fig. 10). Surface 136 continues over the score line 138, into the part-cylindrical surface 140, the surface 140 and an adjacent portion of bevelled surface 136 being the outer surface of the body projection 110. Moreover, the arcuate or part-cylindrical surfaces 135 and 140 are substantially normal to the plane of the shoe body. Additionally and for a purpose to appear, the ends of the projection 110 are reduced to provide shoulders 142, while the surfaces at the ends of the surface portion 140 are curved inwardly relatively sharply as shown. All corners and surface division zones are smoothly rounded to facilitate wire displacement thereover as will later appear.

The opposite end surface 106 on the other hand, is formed to present the uppermost part-cylindrical surface portion 143 continuing smoothly into an inwardly and downwardly bevelled surface 144 of arcuate extent, the latter smoothly merging with a planar surface portion 146 substantially in the plane of the shoe body. Continuing from the planar surface 146 to the lower margin 147 of the shoe extension 112 and constituting the external surface of the latter, is the curved surface 148 which is non-parallel with the inner radially arcuate surface 116 of the extension. The extension 112 in plan view (Fig. 10) thus is somewhat wedge-shape, converging from the wide end 150 to the relatively narrow end 151. At the wide end, the extension is reduced to provide a shoulder 152, while the adjacent surface portion 154 of surface 148, is curved inwardly rather sharply, as shown. Similarly at the narrow end 151, this end is reduced to provide a like shoulder 155, while the adjacent portion 153 of surface 148 is curved inwardly sharply in the zone of the shoulder. Moreover and as appears from Figs. 9 and 10, the surfaces 144 and 146 merge into a rounded surface portion 156 which is at an inclination to surface 146, upwardly toward the juncture of surfaces 143 and shoe side surface 102. This forms a somewhat triangular surface element 157 which is a continuation of the surface 148 upwardly over the shoulder 155 and adjoining the flat side 104 of the shoe.

The foregoing described side and end surfaces of the shoe provide a perimetral surface effective to determine the shape of the coil turns in the coal-forming operation presently to appear. Moreover and importantly herein, these afford camming surface portions especially at the ends 105 and 106 of the shoe, which serve to cause downward displacement of the coil loops substantially as they are formed, in a positive manner and with a snap-displacement of each loop, so that the sides of each coil turn or loop are caused thereby to enter and seat in the core slots.

Describing now the mechanism for supplying wire and conducting the same about the forming shoe 92, the wire source is provided by a spool of wire 158 (Fig. 1) rotatably arranged on a spindle support 159, the wire being of desired gauge and surface-insulated as by an enamel coating. From the spool the wire line 160 extends over guide wheels 161 and 162 carried by an arm structure 163 rotatable on spindle 159 and suitably yieldably braked or retarded in its turning, by a loading spring 164, the line continuing upwardly to and over a guide wheel 166 rotatably carried by a bracket 167 fixed on the upper end of the standard 14 and bracket 15. The wire line extends over a second guide wheel 168 on bracket 167, the latter wheel being located relative to the rotary spindle head 18 so that the wire line 160 continuing downwardly from the wheel, is in a position for direct passage vertically into and downwardly along the hollow interior of the spindle 20.

A block-like member 170 (Figs. 3 and 4) is sleeved on the spindle 20 in a zone thereof between the housing 19 and the lower spindle end 22, and is suitably fixedly secured to the spindle for rotation with the latter. The block is slotted at 171 in registry with an axially directed slot 172 provided through the wall of spindle 20, and arranged through the slots is a guide wheel 174 freely rotatable on an axle pin 175 which is removably supported in the block. As appears from Fig. 4, the position of the guide wheel in its projection interiorly of the spindle 20, is such that the axis of the spindle is substantially tangential to the wheel periphery. Carried externally on the block 170 is a bracket arm 176 projecting laterally therefrom in a direction normal to the spindle 20, and having at its outer end and extending therebelow, a support 178 for a vertically depending chuck or clamp device 179. The device 179 which in construction, may be similar to a tool chuck of ordinary type, is provided for the vertically adjustable support of a tubular element 180 having its free end portion 182 curved toward the horizontal (Fig. 1).

By preference, the block 170 is recessed in its side 183 to receive the bracket 176 and to provide upper and lower guide shoulders 184 for the corresponding upper and lower margins 186 of the bracket. The bracket further has a central longitudinal slot 187 through which extends a bracket mounting screw or bolt 188. Thus the bracket may be adjusted transversely of the spindle to determine the relative spacing of the spindle and clamp or chuck 179, it being noted that the chuck parallels the spindle. Carried on the bracket 176 inwardly of its outer end is a small guide wheel 190, this wheel being freely rotatable on an axle element 191 fixed to the bracket, and located so that the vertical axis of the chuck 179 is tangent to the wheel periphery (Fig. 3).

The wire line 160 extending downwardly in the hollow spindle 20 as before indicated, is extended below and over the guide wheel 174 and thence laterally outwardly from the spindle to and over the guide wheel 190, continuing downwardly through the chuck 179 and through the tubular element 180. The free end 192 of the wire line 160 thus exposed beyond the end of the element 180, is extended to and releasably held in a suitable holding device 194 mounted on the table 10 (Figs. 3 and 5). As here shown, the device 194 comprises a spindle 195 upright on a base member 196, the latter seated on the table 10 and adjustably clamped thereto through a bolt 198 extending through a slot 199 in member 196 and threaded into the table. Freely rotatable on the spindle is an arm 200, the arm resting upon a spring 202 and held thereagainst by a holding nut 203 threaded on the spindle. Supported at the end of the arm 200 is a friction-type vise 204, providing cooperating saw-tooth jaws 206 and 207 between which is clamped the end 192 of the wire.

Turning now to the operation of the mechanism, the magnetic core 70 to be wound, is centered upon the frame or support 71, or if the support 71 is the machine frame for the core, the core and frame unit is placed on the table with the frame hub 72 over the stud 76 of slide block 77. Whereupon the shoe 92 is placed on the polar face of the core, with the shoe flanges 110 and 112 in engagement respectively with the inner and outer core faces 114 and 117, and further, with the shoe flange elements 124 engaged in the slot openings of two of the underlying slots, as hereinbefore described. Now the core and its frame being freely rotatable about the stud 76, are turned to bring the hub 94 of the shoe 92, beneath the stud 23 on the lower end of spindle 20. Vertical or axial alignment of the shoe hub and spindle stud then is attained as the spindle is lowered by operation of lever 27, through actuation of handle 84 to cause displacement of block 77 longitudinally of the table slot 78, and with it the core and its frame. As this is done, the core and its frame may be turned slightly in one direction or the other, until substantially exact alignment is obtained, when the stud 23 on spindle 20 will enter the shoe hub bore 96 as the spindle is lowered, until the stud bottoms against the bore shoulder 98 (Fig. 6).

It may be noted here and as is shown in dotted lines in Fig. 6, the spindle stud 23 preferably is mounted on the lower end of the spindle 20 through roller or ball bearings indicated in dotted lines at 210, whereby the stud may remain stationary in the shoe hub bore 96 while the spindle rotates. Thus the spindle stud 23 when engaged with the shoe 92, provides a foot bearing for the rotary spindle, and importantly also, serves to hold the shoe in place on the core 70.

Following positionment of the shoe and spindle as above described, the bracket 176 is adjusted to locate the chuck 179 and tube element 180 or wire guide as it may be called, such that the latter will clear the periphery of the shoe in spindle rotation of these elements about the shoe during the coil-forming and core slot winding process. Additionally, the tube element is vertically adjusted in the chuck 179 so that the lower curved end 182 thereof clears the polar face 109 of the core 70, as this is indicated in Fig. 3, the curved end 182 being directed oppositely to the direction of its movement about the shoe 92, which is counterclockwise as viewed in Fig. 5.

Before the core is wound, the slots S thereof are lined with suitable inserts 211 of insulating material, this being usual practice in core winding. Furthermore, it is to be noted that in constructing the shoe 92, the undercutting of the edges at the shoe end faces 105 and 106 such as to provide the several shoulders 142, 152 and 155, is determined so that the marginal portions thereof do not overlap or extend over the open ends of the adjacent core slots, as this appears from Figs. 3 and 7. Thus interference with slot insertion of the coil turns and with the final windings in the slots, is thereby avoided.

The mechanism having its coil feeding and winding parts arranged relative to each other and to the core as above described, is now ready for the winding process, the wire line 160 leading from the spool supply through the mechanism to the clamp 194, being directed over the shoe end face 106 (Fig. 5) under a slight tension as may be determined by the resistance of the braking spring 164 at the spool support 159. Now upon depression of the foot treadle 51 by the operator, to operate the clutch 42 for connecting the motor drive to the spindle 20, the resulting rotation of the spindle produces rotation of the wire guide tube 180 about the shoe 92. The rate of tube movement about the shoe may be controlled to any desired extent, by adjustment of the reduction gear unit 31, as to determine for example, a tube speed of say one to five or more revolutions per second, depending in part upon the number of coil turns to be wound, and in part upon the size of the wire to be wound, a greater speed of winding being employed for light or small diameter wire and a lesser speed for heavy or large diameter wire. The tube 180 in its rotation, feeds wire from the spool source and guides the wire issuing from the tube end 182, about the shoe side and end surfaces, thereby forming successive coil loops of a shape determined by the peripheral surfaces of the shoe 92, as this will appear more fully hereinafter.

As will appear from Figs. 3 and 5, at the outset of the operation the wire from its end held by the clamp 194, extends over and in contact with the shoe end surface portion 148 and upwardly over the cam surface portion 157, and thence away from the shoe to the end 182 of the guide tube 180. Now as the guide tube is rotated counterclockwise about the forming shoe, as viewed in Fig. 5, the wire 160 having its end fixed at the clamp 194, will feed through the tube 180 and be led by the tube end 182, along the shoe side 104 and thence over and in engagement initially, with the bevelled surface 134 at the shoe end face 105. As this occurs, the portion of the wire contacting the shoe end surface portion 157, is cammed downwardly thereby, the wire snapping over the shoulder 155 and thence downwardly over the end or tip surface 153. The wire thus is caused to enter the core slot 122 through the slot opening 121, being guided thereinto by the flat side 104 of the shoe which parallels the slot opening 121 thereover. Similarly at the inner end 105 of the shoe, the wire is cammed downwardly by the shoe end surfaces 134 and 136, snapping over the shoulder 142 and downwardly over the sharply curved end of the surface 140.

The guide tube 180 continuing the wire line about the shoe, thence brings the wire along the opposite flat side 102 of the shoe, the wire snapping over the shoulders 142 and 152, the latter at the forward end of the shoe, and entering slot 120 through slot opening 118. Entering of the wire through slot opening 118 is here assisted by the shoe surface 144 which as the wire is led thereover by the guide tube 180, cams the wire downwardly to a position beneath the shoe surface 146 and in contact with the surface 148. The first coil loop is thus completed, being shaped by the shoe surfaces engaged thereby in the winding process and cammed by these surfaces, into position in the core slots 120 and 122. Each succeeding coil loop is formed and seated in the slots in exactly the same manner, and the winding process is continued until the desired number of coil turns has been formed in the slots.

It may be repeated here that the shoe camming surfaces at the ends 105 and 106, including the shoulders at the ends of these surfaces, serve to effect positive movement or snap-displacement of the coil turns as they are formed by the shoe, toward the core and such as to cause the sides of the turns to enter and seat in the core slots. Moreover, it is to be noted that by reason of the snap-in of the coil loops in the slots, the coils tend to build up from the bottom of the slots in superposed layers, so that as has been found in practical application of the present apparatus, the final windings are remarkably uniform and further, each winding is found to be of substantially uniform winding section in the slot sides thereof.

In order to advise the operator when the desired number of coil turns in the slots is reached in the winding operation, an indicating coil-turn counter device 215 of any suitable known type, may be provided in full view of the operator, preferably on the spindle head housing 19 as shown in Fig. 2. The counter drive is provided from the rotary spindle 20, through gearing 216. It may be noted here although not shown, that the counter 215 may be readily adapted in well-known manner to afford automatic stoppage of the winding process when the selected number of turns is attained. To this end, the counter may control a cut-out switch in the energizing circuit to motor 28.

Upon completion of the coil-forming and winding process as to slots 120 and 122, the spindle 20 is lifted to clear the spindle stud 23 relative to the shoe 92, so that the latter is free to be lifted from its core seating and reapplied on the core to align the shoe sides 102 and 104 say with the next adjacent core slots 128 and 218 respectively, as viewed in Fig. 3. Whereupon the core assembly is again adjusted in the manner hereinbefore described, to locate the same for insertion of the spindle stud 23 in the bore 96 of shoe hub 94. Following this, the winding process is repeated as to the slots 128 and 218. In this way, the entire core 70 may be easily and quickly provided with coil windings.

Figure 12:
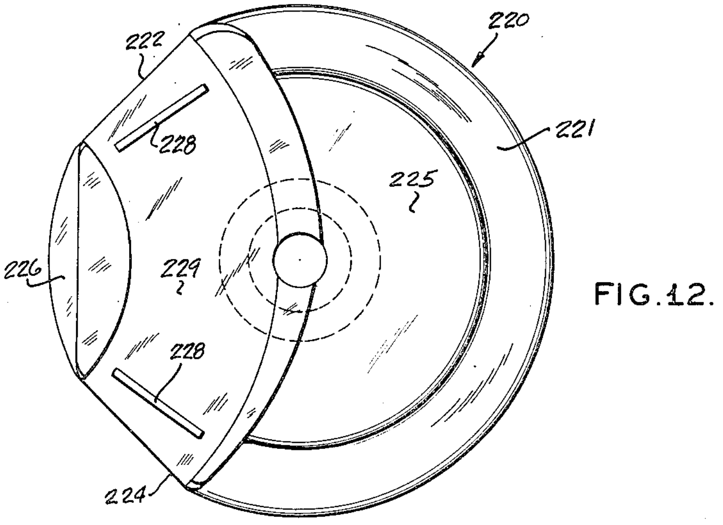
Fig. 12 is a view in plan, looking at the underside of a shoe modified in form over the shoe illustrated in Fig. 10 for example, for a purpose to appear from the following description.

While the shoe 92 hereinabove described, is shown as adapted for spanning five core slots and hence, serving in the winding process to form and apply coil windings to the core such that the coil sides will be in the first and fifth of the slots spanned, it will be readily appreciated now that coil windings spanning a different number of slots, may be obtained by substituting for the shoe 92 a similar shoe characterized however, by its adaptation for spanning less than five slots or a greater number thereof. For example, there is illustrated in bottom plan elevation in Fig. 12, a forming and winding shoe 220 adapted to span eleven slots of the core to be wound. Although the coil-forming and applying function of this shoe is the same in result, as obtains for the shoe 92, there are differences in certain of the wire camming surfaces thereof, as readily appear. The bevelled surface 221 at the forward or wide end of the shoe, is fairly uniform from one shoe side 222 to the other side 224, and is of circular extent on a substantially uniform radius. The planar surface 225 also is here of greater extent than the corresponding surface 146 of shoe 92. Further, at the narrow end of the shoe there is formed but a single bevelled surface 226, this taking the place of the two bevelled surfaces 134 and 136 at the end face 105 of shoe 92. As for the slot-engaging, shoe locating flange elements 228 outstanding on the pole face engaging surface 229 of the shoe, these by preference are relatively spaced such that one seats in the slot opening of the second slot and the other in the slot opening of the tenth slot, of the eleven slots spanned by the shoe.

The present apparatus is well adapted without change except in the substitution of forming shoes, to the winding of magnetic cores of different diameters. Since the chuck 179 carrying the wire guide 180 is adjustable toward or from the spindle 20 through the slot mounting of the bracket 176 on the block 170, while the guide 180 is adjustable vertically in chuck 179, and the core mounting stud 76 of block device 77, is adjustable along the table slot 78, these parts may be adjusted to any given diameter core, so that both large and small cores may be wound with equal facility.

The foregoing description relates to a presently preferred embodiment of the invention as such is illustrated by the drawings, and it is to be understood that such is not presented in any limiting sense, since it will be appreciated that modifications in the structure and relation of parts thereof may be made without departing from the spirit and full intended scope of the invention, as defined by the appended claims.

We claim:

1. In a device for forming and winding coils in the slots of magnetic core members for electrical machines and the like, a coil forming member provided as a single block element adapted for positionment on a core to span a selected pair of the core slots, and means operable to lead a line of wire about said forming member to form coil loops, said forming member having opposite curved camming surfaces and shoulders at the ends of the camming surfaces engaged by the wire loops as they are formed, effective to cause displacemet of the wire loops toward the core to seat portions thereof in said pair of core slots.

2. In a device for forming and winding coils in the slots of magnetic core members for electrical machines and the like, a coil forming member positionable on a core to span a selected pair of core slots, said member being comprised of a single block element formed on its periphery to afford relatively planar surface portions for registry with said selected slots and angulate surface portions joining the planar surface portions, each of said angulate surface portions including an intermediate inwardly beveled surface substantially coextensive with the length of the angulate surface portion and shoulders adjacent the ends of the beveled surface, and means movable about the periphery of said member in relatively close proximity thereto, operable to lead a line of wire about and in substantial contact with said surface portions of the member to form coil loops, said angulate surface portions being effective through said shoulders and beveled surfaces to cause displacement of each coil loop as it is formed, toward the core, and said planar surface portions serving upon loop displacement, to guide the loop portions in contact therewith into the selected pair of core slots.

3. In a device for forming and winding coils in the slots of magnetic core members for electrical machines and the like, a coil forming member adapted for support on a core to span a selected pair of core slots, and wire feeder means including a wire guide movable continuously about said member and operable to lead a line of wire in substantial contact with the member such as to form successive coil loops, said coil forming member comprising a single block element providing opposite curved end surfaces each including an intermediate beveled surface portion of a length approximating the length of the end surface and shoulders adjacent the ends of the beveled surface portion, said block element being effective through said shoulders and beveled surface portions, for causing a substantially snap-displacement of each coil loop as it is formed, toward the core such as to seat portions of the coil loop in said selected slots.

4. The combination with a magnetic core for an electrical machine, characterized by a planar pole face of circular extent and substantially radially directed slots therein, of means for forming and winding coils in the core slots, comprising a member having opposite substantially planar sides and curved ends joining the planar sides, each curved end of said member having an intermediate beveled surface portion substantially coextensive with the length of the curved end and shoulders near the end margins of the curved end, said member being positionable on the core pole face to span a selected pair of the core slots, with the planar sides of the member in registry with the selected slots, means movable about the member and operable to lead a line of wire in contact with said sides and ends to form successive coil loops, said curved ends of the member serving through said beveled surfaces and shoulders thereof, to cause snap displacement of the coil loops as they are formed, toward the core, and said planar sides of the member serving upon loop displacement, to guide the loop portions in contact therewith, into said selected core slots, and drive means for said movable means, regulatable for determining the rate of movement of the latter means.

5. In a device for forming and winding coils in the slots of magnetic cores for electrical machines and the like, a coil forming member adapted for positionment on a core to span a selected pair of core slots, a line of coil wire extending adjacent said member, means for holding the free end of said wire line, a wire guide rotatable about said member and operable to lead the wire line about the forming member to form coil loops, said forming member being provided to have wire-engaging surfaces of a predetermined curvature, each including an intermediate beveled surface portion substantially coextensive with the length of the curved surface and shoulders near the marginal ends of the surface, thereby adapting the member for causing displacement of the coil loops as they are formed, toward the core to seat portions thereof in the selected core slots, and drive means for said wire guide, adjustable to determine the rate of guide rotation about the forming member.

6. A coil forming member of the character described, comprising a forming shoe having opposite substantially planar sides normal to the plane of the shoe, curved ends joining the planar sides and each including a beveled surface portion over approximately the length of the end, and said shoe further having a shoulder formed in one end margin of each of said curved ends.

7. A coil forming member of the character described, comprising a forming shoe having opposite substantially planar sides normal to the plane of the shoe, curved end surfaces joining the planar sides and each including an intermediate beveled surface portion over approximately the length of the end, and the marginal ends of each of said curved end surfaces being reduced to form shoulders adjacent the ends of said beveled surface portions.

8. A coil forming member of the character described, comprising a forming shoe having opposite substantially planar sides normal to the plane of the shoe, and arcuate ends of unequal length, said sides diverging uniformly from the shorter arcuate end to the longer arcuate end of the shoe, the shorter arcuate end being formed to present distinct inwardly beveled surface portions and a part-cylindrical surface portion adjoining one of said beveled surface portions and having its ends reduced to form shoulders adjacent the ends of said beveled surface, and the longer arcuate end of the shoe being formed to provide an inwardly beveled surface portion and a curved surface normal to the plane of the shoe, spaced from the beveled surface and terminating in shoulders at it ends, said curved surface at one end of the longer arcuate shoe end, continuing to intersection with said beveled surface.

9. A coil forming member of the character described, for positionment on a magnetic core having a planar pole face of circular extent, and radial slots therein, comprising a forming shoe having opposite substantially planar sides normal to the plane of the shoe and end surfaces joining said planar sides, each of the end surfaces having a surface contour of predetermined curvature, including a beveled surface portion over approximately the length of the end, the marginal ends of said end surfaces being reduced to form shoulders adjacent the ends of said beveled surface portions, and means on said shoe engageable with the core such as to locate the shoe on the core pole face to align the planar sides of the shoe with a selected pair of the core slots.

10. Mechanism for forming and winding coils on slotted magnetic cores for electrical machines, wherein the core is characterized by a planar pole face of circular extent, having substantially radially directed slots therein, a table, means on the table providing a core support, said core support receiving a core thereon with the core pole face horizontal and exposed above the table, a rotary spindle operatively supported on the table in a vertical position over the core support, controllable drive means for said spindle, a coil-forming shoe positionable on the face of the core and adapted for spanning a selected pair of the core slots, said core support being both rotatable and bodily shiftable relative to the table, whereby to permit location of said shoe in its position on the core, vertically below said spindle, a wire guide device on said spindle and arranged for rotation about said forming shoe, means affording a source of coil wire, means guiding a line of wire from the source, to said spindle and through said guide device and adjacent said shoe, and holding means on the table for the free end of the wire line, said guide device upon spindle rotation, rotating about said shoe and leading the wire line in contact therewith to form successive coil loops, said shoe being adapted for causing displacement of the loops as they are formed, toward the core to enter portions thereof in said selected pair of core slots.

11. Mechanism for forming and winding coils on slotted magnetic cores for electrical machines, wherein the core is characterized by a planar pole face of circular extent, having substantially radially directed slots therein, a table, means on the table providing a core support, receiving the core thereon in a horizontal position with the slots uppermost, a longitudinally hollow rotary spindle operatively supported on the table in a vertical position over the core support, controllable drive means for said spindle, a coil-forming shoe positionable on the core pole face and adapted for spanning a selected pair of core slots, said core support being both rotatable and bodily shiftable relative to the table, whereby to permit location of said shoe in its position on the core, vertically below said spindle, a wire guide device carried by said spindle and extending downwardly for rotation about said shoe upon spindle rotation, means affording a source of coil wire, means guiding a line of wire from the source to and through said hollow spindle, thence to and through said guide device to adjacence with said shoe, and holding means on said table for the free end of the wire line, said guide device upon spindle rotation, rotating about the shoe and leading the wire line in contact therewith to form successive coil loops, said shoe being formed to provide camming surfaces engaged by the wire in loop formation, adapted for causing displacement of the coil loops as they are formed, toward the core to enter portions thereof in said selected pair of core slots.

12. Mechanism for forming and winding coils on slotted magnetic cores for electrical machines, wherein the core is characterized by a planar pole face of circular extent, having substantially radially directed slots therein, a table, means on the table providing a core support, receiving the core thereon in a horizontal position with the slots uppermost, a rotary spindle operatively supported on the table in a vertical position over the core support, said spindle being vertically displaceable toward and from the core support, a bearing element on the lower end of the spindle, a controllable drive for said spindle, a coil-forming shoe positionable on the core pole face and adapted for spanning a selected pair of core slots, the shoe providing a hub having an upwardly opening recess therein, said core support being both rotatable and bodily shiftable relative to the table, whereby to permit location of said shoe in its position on the core, vertically below said spindle with said hub recess in alignment therewith, said spindle in operation, being displaced downwardly to seat said bearing element in said shoe hub recess, a wire guide device carried by said spindle and extending downwardly for rotation about said shoe upon spindle rotation, means affording a source of coil wire, means guiding a line of wire from said source to said spindle and into guided association with said guide device, the wire line continuing from the latter to adjacence with said shoe, and means on the table for holding the terminal end of said wire line, said guide device upon spindle rotation, rotating about the shoe and leading the wire line in contact therewith to form successive coil loops, said shoe being adapted for causing displacement of the coil loops as they are formed, toward the core to enter portions thereof in said selected pair of core slots.

GORDON R. ANDERSON.
JAMES K. GIBBS.

REFERENCES CITED

The following references are of record in the file of this patent:

UNITED STATES PATENTS

| Number | Name | Date |
|---|---|---|
| 1,408,639 | Rhoades | Mar. 7, 1922 |
| 1,431,947 | Gysel | Oct. 17, 1922 |
| 1,503,254 | Sippel et al. | July 29, 1924 |
| 1,518,209 | McCord | Dec. 9, 1924 |